(12) United States Patent
Kral et al.

(10) Patent No.: US 12,632,493 B2
(45) Date of Patent: May 19, 2026

(54) PARALLEL SEARCH RESULT PIPELINE EVALUATIONS

(71) Applicant: MICROSOFT TECHNOLOGY LICENSING, LLC, Redmond, WA (US)

(72) Inventors: Kyle Thomas Kral, Redmond, WA (US); Nitesh Prabhu, Seattle, WA (US); Austin Bradley Hodges, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/669,468

(22) Filed: May 20, 2024

(65) Prior Publication Data

US 2025/0355930 A1 Nov. 20, 2025

(51) Int. Cl.
  *G06F 16/535* (2019.01)
  *G06F 16/538* (2019.01)
(52) U.S. Cl.
  CPC .......... *G06F 16/535* (2019.01); *G06F 16/538* (2019.01)
(58) Field of Classification Search
  None
  See application file for complete search history.

(56) References Cited

U.S. PATENT DOCUMENTS

| | | | | |
|---|---|---|---|---|
| 9,430,533 | B2 * | 8/2016 | Awadallah | ........ G06F 16/24578 |
| 2008/0140641 | A1 * | 6/2008 | Wang | .................... G06F 16/951 |
| | | | | 707/999.005 |

| | | | | |
|---|---|---|---|---|
| 2013/0173569 | A1 * | 7/2013 | Pearcy | ................ G06F 16/9538 |
| | | | | 707/706 |
| 2017/0357650 | A1 | 12/2017 | De Almeida Forjaz De João Pedro et al. | |
| 2018/0123918 | A1 * | 5/2018 | Steinhauser | ........ H04L 43/0858 |
| 2019/0342194 | A1 * | 11/2019 | Mermoud | ................ G06N 3/09 |
| 2021/0004420 | A1 | 1/2021 | Mittal et al. | |
| 2021/0150615 | A1 * | 5/2021 | Sureshchandra | .. G06Q 30/0641 |
| 2023/0386054 | A1 * | 11/2023 | Collomosse | ........... G06T 7/337 |

OTHER PUBLICATIONS

Extended European search report received for European Application No. 25175758.9, mailed on Jul. 28, 2025, 08 pages.

* cited by examiner

*Primary Examiner* — Yu Zhao
(74) *Attorney, Agent, or Firm* — David Foster; Newport IP, LLC

(57) ABSTRACT

The disclosed techniques run multiple indexing pipelines and multiple search pipelines on a local device. Search results are presented in a first ordering according to a default search pipeline using data generated by one or more of the indexing pipelines. Other orderings of search results generated by other search pipelines are similarly generated. A user selection of one of the search results is received. Search pipelines that ranked the selected result higher than the default pipeline are identified as being better aligned with actual user preferences. Different indexing pipelines may utilize different indices, different thresholds, among other variations. Search result feedback may be aggregated from multiple users to identify more accurate, more efficient, or otherwise better search pipelines. This feedback may also be used to personalize the default search pipeline for a particular user or a particular class of users.

20 Claims, 10 Drawing Sheets

IMAGE REGION 312B　　TEXT REGION 310　　IMAGE REGION 312A

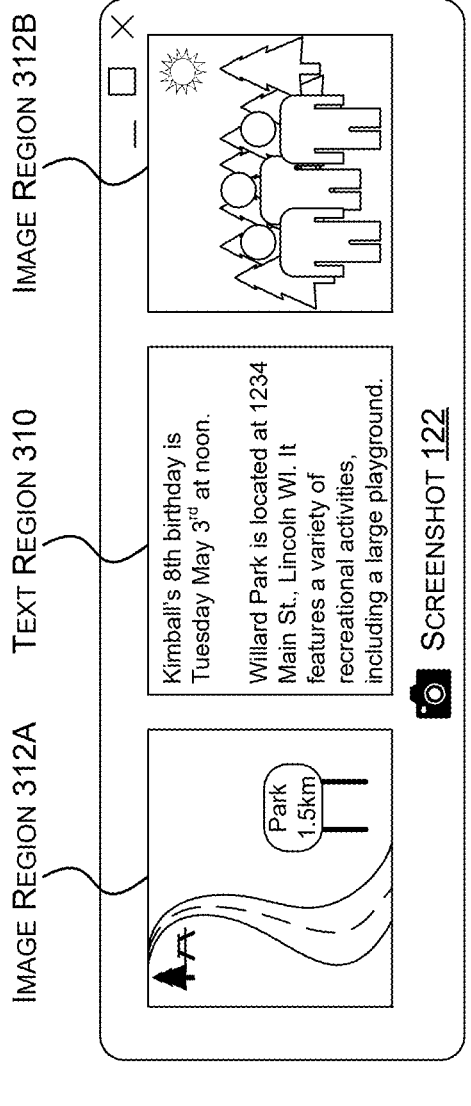

Kimball's 8th birthday is Tuesday May 3rd at noon.

Willard Park is located at 1234 Main St., Lincoln WI. It features a variety of recreational activities, including a large playground.

Park 1.5km

SCREENSHOT 122

Kimball

Tuesday May 3rd at noon.

Willard Park

1234 Main St., Lincoln WI

NAMED ENTITIES 336

Kimball's 8th birthday is Tuesday May 3rd at noon.

Willard Park is located at 1234 Main St., Lincoln WI. It features a variety of recreational activities, including a large playground.

Park 1.5km

TEXT 314

FIG. 3

ENTITY HIGHLIGHT 610

Kimball's 8th birthday is Tuesday May 3$^{rd}$ at noon.

Willard Park is located at 1234 Main St., Lincoln WI. It features a variety of recreational activities, including a large playground.

Park 1.5km

PARALLEL SEARCH RESULT PIPELINE EVALUATIONS

BACKGROUND

Operating system (OS) search allows a user to find files, folders, and other content on their computing device. Recent advances in machine learning technology have enabled searching through a timeline of screenshots that were taken as the user interacted with their device. This allows the user to find interactions with applications, exchanges that took place during a videoconference, content that was entered into a web form, videos that depicted a particular scene, among other transient and non-transient experiences.

It is with respect to these and other considerations that the disclosure made herein is presented.

SUMMARY

The disclosed techniques run multiple indexing pipelines and multiple search pipelines on a local device. Search results are presented in a first ordering according to a default search pipeline using data generated by one or more of the indexing pipelines. Other orderings of search results generated by other search pipelines are similarly generated. A user selection of one of the search results is received. Search pipelines that ranked the selected result higher than the default pipeline are identified as being better aligned with actual user preferences. Different indexing pipelines may utilize different indices, different thresholds, among other variations. Search result feedback may be aggregated from multiple users to identify more accurate, more efficient, or otherwise better search pipelines. This feedback may also be used to personalize the default search pipeline for a particular user or a particular class of users.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3 illustrates regions identified within a screenshot and text extracted from the screenshot.

DETAILED DESCRIPTION

Figure 1:
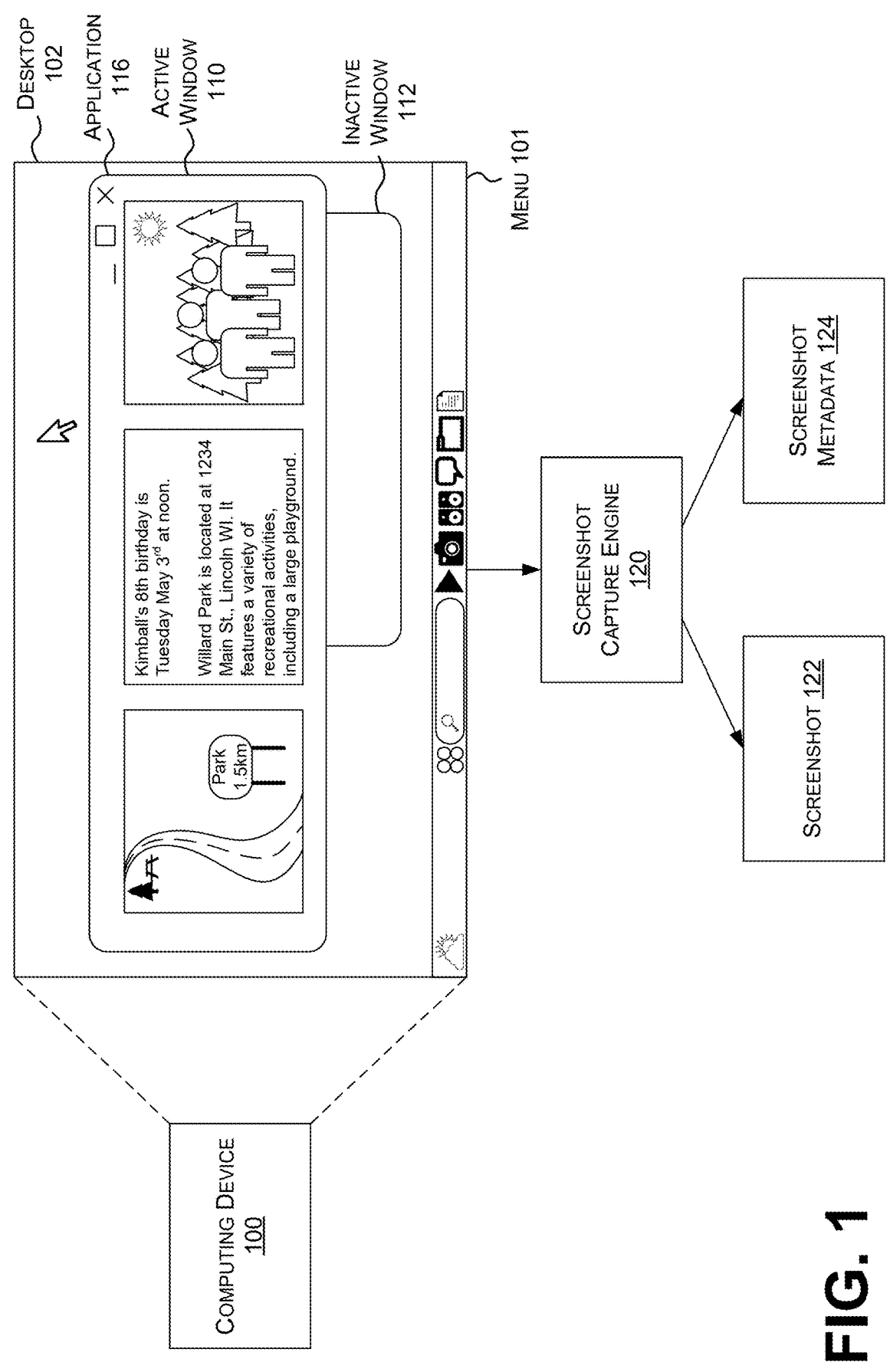
FIG. 1 illustrates capturing a screenshot of a computing device.

OS search is improved by enabling new types of content to be indexed and retrieved. Traditional OS search indexes file contents. However, much of what is displayed by a computing device is not stored in a file on disk. For example, web forms are filled out and submitted to web sites directly. Similarly, in-game interactions may be generated dynamically, and as such are not available for retrieval from disk. Even content that is backed by a file, such as a document that is open in a word processor, may change significantly before it is saved to disk. Accordingly, a significant amount of user-generated content is lost to traditional OS search techniques. To address this deficiency, screenshots of one or more computer desktop displays are intermittently captured and indexed, allowing new types of content to be stored and retrieved, including transient content that is never stored in a file.

Screenshots are captured intermittently to increase the amount and type of content available for future retrieval. Screenshots may be captured at key points in time, such as in response to a window being made visible, when a document has been opened, or in response to user input. Screenshots may also be captured periodically, reducing the chance that a particular piece of content is missed.

Screenshots may be pre-processed before being indexed. For example, machine learning models or other techniques may be used to identify regions of interest of the screenshot. These regions may be used to focus indexing and retrieval on the most relevant portions of the screenshot. Examples of regions of interest include an active window, text blocks, images, video, etc. Content typically excluded from regions of interest includes desktop background, OS generated content such as a menu bar, and other content that is not particular to the user or otherwise unlikely to be the target of a user history query. Indexing regions of interest within screenshots improves the granularity at which user history queries operate, allowing for a more nuanced understanding of the screenshot's content.

Screenshots, or region(s) thereof, may also be analyzed to identify entities, such as faces (including those of particular people), animals, buildings, or other recognizable objects. Entities identified within a screenshot may be used to further refine screenshot indexing and retrieval. Entities identified within a screenshot may also be used to adjust how query results from different sub-queries are merged into a final query response.

Another type of pre-processing is text extraction. Text may be extracted from regions of interest or the entire screenshot. Extracted text may also be a basis for indexing and retrieving screenshots. The extracted text may also be analyzed to identify named entities, such as a person's name, a photo, or an address, etc. These named entities may be used, along with visual entities and metadata associated with the screenshot, when applying a filter to a user history query.

Screenshots, or region(s) thereof, may be indexed in a number of ways, including a semantic search and a full text search. Semantic search identifies screenshots that are similar to a user history query in an embedding space, and may be applied to text extracted from a screenshot or the pixels of the screenshot itself. Full text search uses string distance to find text that is similar to the text of the user history query, such as a BM25 result returned from a full text index.

Embedding vectors may be generated from a screenshot, a region within a screenshot, and/or text extracted from a screenshot. Embedding vectors—referred to herein as embeddings—are multidimensional arrays of numbers that represent content in an embedding space. Proximity in the embedding space indicates similarity—two embedding vectors that are relatively close in the embedding space are more likely to be related, at least in some dimensions, than embedding vectors that are further apart.

In some configurations, embedding vectors are generated using machine learning models. Different models may be used for different types of content. For example, one model may be used to generate embeddings from text content extracted from the screenshot, while another model may be used to generate embeddings from pixels of the screenshot. In some configurations, different models may be used to generate embeddings for the same type of content. Models may be selected based on trade-offs between accuracy and required computing resources. Models also may be selected based on the type of model, the size of the model, the training data used to generate the model, among other configurations. The generated embeddings may be stored, e.g., in a vector database, for later retrieval. Model selection is one aspect of an indexing pipeline, as discussed below.

The dimensions of the embedding spaces used for text and image search may range from a small number, such as 20 dimensions, to thousands or more dimensions. For example, text-based embeddings may be encoded in 100 dimensions, while image-based embeddings may be encoded in 400 dimensions. Increased model complexity and embedding dimensionality may increase the quality of search results, but at the expense of storage, memory, and computing resources. In some configurations, the number of parameters used by a model and the number of dimensions of the embeddings computed by the model are restricted to meet performance and resource constraints of executing on a local computing device.

Using embeddings extracted from screenshots to search for content enables access to more and different types of content, as well as increased flexibility when accessing traditional search targets. Embedding-based searches enable search results to be identified from a semantic match, not merely relying on lexical matches. For example, a user may recall a physical feature about someone they had a meeting with. A user history query such as "meeting yesterday where a man was wearing glasses" enables finding a video stream of a meeting in which a man was wearing glasses. In this example, the meanings of "meeting" and "man wearing glasses" are used to find screenshots of videos that contain the same or similar meanings. In some configurations, a calendar appointment for the meeting may also be identified.

In some configurations, semantic search and full text index search are augmented with constraints. One source of constraints is the user history query itself. Natural language processing may be applied to the user history query to extract constraints, such as file name, search timeframe, etc. For example, in a query such as "meeting with the deck about financial charts two days ago or last Wednesday", "two days ago or last Wednesday" is identified as a timeframe. Also, "deck" may be identified as a file type. Other examples of entities that may be extracted from a query include the names of individuals, names of applications, etc. Natural language processing may be performed with a machine learning model or other NLP techniques to identify key words and concepts within the search query.

The search query is then processed by a metaquery engine that adapts the user history query to search multiple data stores and indices. A user history query may include text, images, or a combination of text and images. The user history query may be converted to embeddings for semantic searches. Different embeddings may be inferred for each semantic index, such as one embedding for a text-based index and a different embedding for an image-based index. In some configurations, the embeddings are generated using the same machine learning models that were used when populating the corresponding index. As referred to herein, embeddings are inferred from machine learning models using an inference operation of the model.

Screenshots that are relevant to the user history query are obtained from a semantic index based on distances between the query embedding and the screenshot embeddings. In some configurations, screenshot embeddings that are closest to the query-derived embedding are selected. Closeness in this context may refer to a cosine similarity or Euclidian distance. Additionally, or alternatively, screenshot embeddings within a defined distance of the query embedding are selected.

In some configurations, responses to the user history query may also contain traditional OS search results. For example, query embeddings and constraints extracted from the search query may be used to retrieve data from an OS data store. For instance, an indexer store, which stores file names, may be accessed to search for files referenced by the user history query. These file names may be incorporated into the search results or used to refine how screenshots are selected.

In addition to embeddings-based semantic search, a relational database maintains a full text index over text that was extracted from screenshots. This full text index may be queried to find screenshots based on exact phrase matches or partial phrase matches.

In some configurations, search results from multiple sources are integrated into a single list of search results. In other configurations, text-based results (e.g., full index search and text-based embeddings) are listed together and image-based embedding results are listed separately.

The relevance of search results is often quantified with a numeric score. For semantic search, the score may be the distance from the screenshot embedding to the query embedding. For full-text search, the score is a measure of closeness of the user history query and the extracted text, e.g., a string distance. However, these scores are not immediately comparable, since different semantic indices use different machine learning models to infer embeddings, and neither semantic score is immediately comparable to the score returned by the full text index. The range of possible values of the different types of search may vary widely, such that a direct comparison may falsely indicate that all of the results from one type of search are better than all the results of another type of search. To address this issue, heuristics are applied that normalize the search results so that they can be meaningfully ranked.

Continuing the example from above, search results for "man in eyeglasses" may return screenshots of emails, notes, or chat sessions that contain this text or related text. Text-based results from a text-based semantic search may be more expansive, such as including text that refers to "spectacles," while results from a full text search may be more literal. Another set of search results from a visual semantic search may include screenshots in which there is an image of a man wearing eyeglasses. Different weights may be assigned to the scores obtained from the different indices in order to meaningfully rank the merged list of results.

In some configurations, the user history query, entities and other conditions identified by the pre-processing step, as well as constraints explicitly imposed by a user, are used to generate a relational database query to search the full text index. The relational database query may include criteria such as a WHERE clause that limits search results based on screenshot metadata. For example, the query may be limited to screenshots that were generated by a particular application or on a particular date. A full text index query returns screenshots that are most associated with the user history query based on a string comparison to text extracted from the screenshots.

Semantic search indices do not have a built-in way to express additional constraints. In order to address this deficiency, a condition similar to the WHERE clause added to the relational database query may be generated for semantic searches. This condition may be based on the user search query, entities extracted by the pre-processing step, and any conditions explicitly set by the user. The condition may be applied to screenshot metadata after the screenshot has been obtained from a semantic index. Any screenshot with metadata that does not meet the condition is omitted from the search results.

The techniques described herein to search for screenshots may also be applied when searching for documents or other files. In these different contexts, additional constraints may be added to the user history query, results from different indices may be emphasized or de-emphasized, results from different types of search may be emphasized or de-emphasized, etc. For example, the weights used to integrate search results from different indices may be adjusted to emphasize results from one index over another. For instance, if the user history query is received from a file explorer, where search results are primarily files which contain text, then weights applied to the results of text-based indices may be increased relative to weights applied to the results of image-based indices.

Once results of the user history query are displayed, a user may select a search result to view a full context including the full screenshot, metadata associated with the screenshot, date and time information, etc. The search result may also be selected to restore the application to the state it was in when the screenshot was captured. For example, a document that contained the indexed content may be opened. In the case of a web page, a web browser may be opened and navigated to the web page that the user was viewing when the screenshot was taken.

In some configurations, screenshots displayed as search results are augmented by highlighting particular regions, text, or other content that is relevant to the user history query. For example, text that was extracted from a screenshot, and which was converted to an embedding that was matched with the search query embedding, may be highlighted in the image search result. Screenshots displayed in search results may also be augmented by making text identified within the screenshot selectable and copyable.

Users may also interact with search results to adjust preferences, such as privacy settings. For example, a user may elect to delete a search result and any associated data or records. The user may also choose to prevent similar records from being created in the future, e.g., by blocking screenshots of the same application or websites from the same domain name.

As discussed above, the present techniques may be implemented with a variety of technologies including machine learning models that compare a user history query to a history of screenshots, full-text queries of text extracted from screenshots, and relational database queries over screenshot metadata. There are many options for each of these technologies, as well as options for how to integrate them into different pipelines. Providing the most accurate and the most useful search results requires selecting a combination of screenshot analysis technologies and algorithms that best meet user expectations.

However, it can be challenging to evaluate the effectiveness of search pipelines across a wide range of users while respecting user privacy. Many of the technologies used to implement the present search techniques utilize private, potentially sensitive screenshots, which users are uncomfortable sharing.

Therefore, one goal of the disclosed configurations is a per-user measurement of the accuracy of search results, while maintaining user privacy. This allows the indexing pipelines and the search pipelines to be tuned to specific users, e.g., choosing the number, types, and sizes of models to use, how different types of sub-queries are normalized and integrated, ranking algorithms, and other configurable aspects of the indexing and search pipelines. Privacy is maintained, as sensitive user-generated data never leaves the user's device.

FIG. 1 illustrates capturing a screenshot of a computing device. Computing device 100 displays desktop 102 on one or more display screens. Computing device 100 may be a personal computer, a tablet, smartphone, wearable device, or any other computing device with a graphical display. Desktop 102 refers to graphics content spanning one or more displays in which applications may display content.

Application 116, for example, displays a birthday invitation. Active window 110 of application 116 is an example of a window that is receiving user input. Inactive window 112 is an example of a window that is not receiving user input, and which may be partially occluded. In some configurations, whether a window is active or not is one factor when selecting regions of a screenshot for indexing. For example, active window 110 may be a region of a screenshot used for indexing, while inactive window 112 may not.

Screenshot capture engine 120 may intermittently capture screenshots 122 and accompanying screenshot metadata 124. In some configurations, screenshot 122 is an image of desktop 102, while in other configurations screenshot 122 is an image of one or more individual applications displayed on desktop 102. Screenshot metadata 124 may include a list of applications that were running when the screenshot was captured, including the locations and dimensions of application windows, title bar text, the names of documents that are opened by particular applications or that are currently displayed by particular applications, and the like. Screenshot metadata 124 may be used to filter of user history query. Screenshot metadata 124 may also be used to reconstitute application 116 when a screen shot of application 116 is selected in a list of search results of a user history query.

Figure 2:
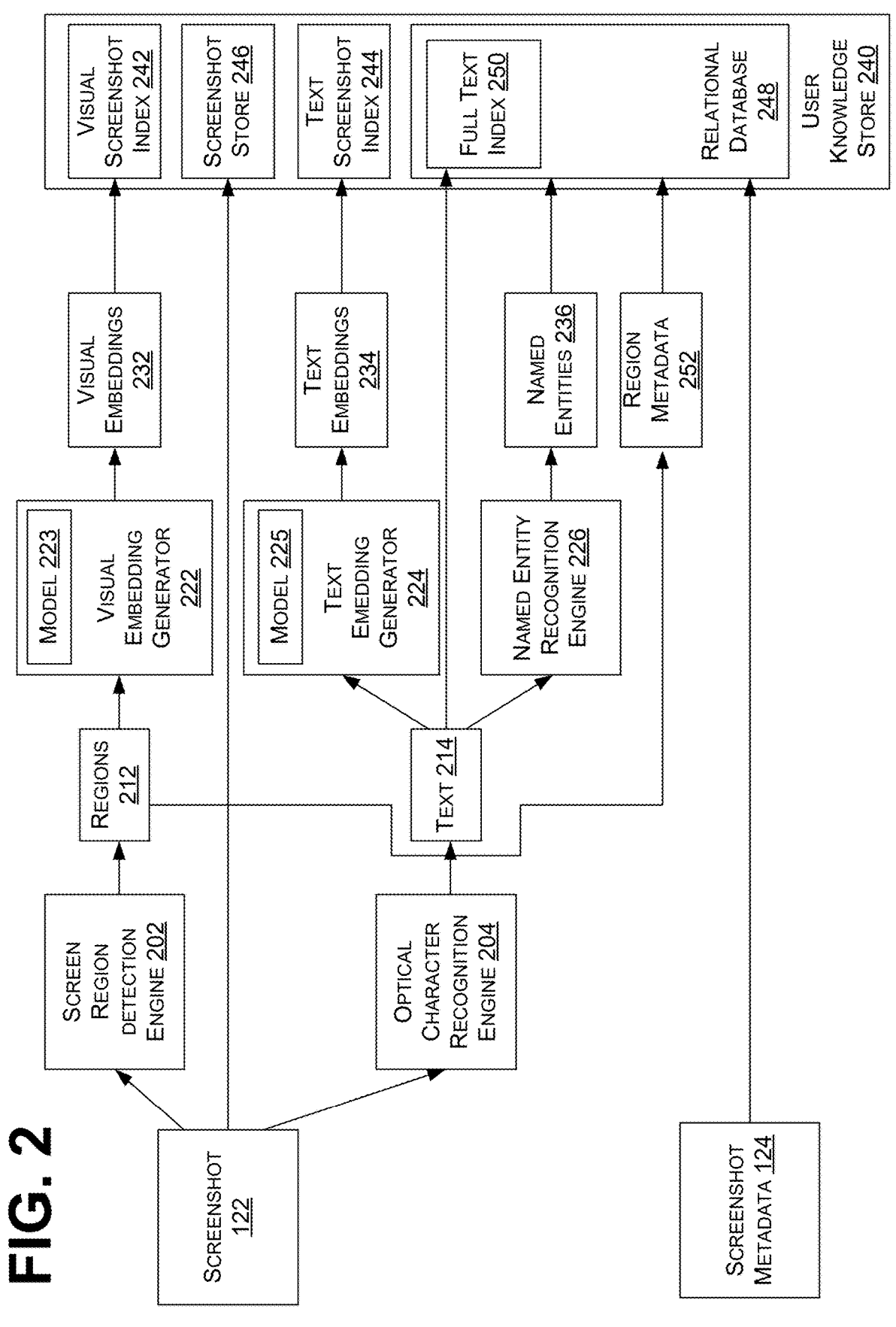
FIG. 2 illustrates indexing a screenshot in a semantic search index and a full text index.

FIG. 2 illustrates indexing a screenshot in a semantic search index and a full text index. There are many ways in which a user may remember an interaction with their computing device. They may recall an e-mail chain with a particular customer number, or they may remember visiting a website about vacation planning, or they may remember having a meeting with a man wearing glasses, or they may remember watching an instructional video late in the evening. It is challenging if not impossible for users to craft traditional OS search queries that find documents and other information related to these events. In some cases, there is no way for a traditional OS search query to express these types of interactions, and in other cases there is no file or other operating system object(s) that adequately respond to the query.

For these reasons, multiple types of indices are used to index screenshot 122. One type of index is a semantic index, which represents screenshots and user history queries as embeddings in an embedding space. In a semantic index, screenshot embeddings that are closest to a query embedding represent screenshots that are most closely related to the user history query. FIG. 2 illustrates two semantic indices—visual screenshot index 242 and text and metadata index 244.

A full text index 250 is another type of index that may be used for indexing and retrieval of screenshot 122. Full text index 250 may be part of a relational database 248, as illustrated, although full text index 250 may also be a separate entity of user knowledge store 240.

Screenshot 122 is processed by screen region detection engine 202 to identify regions 212. Regions 212 may be portions of screenshot 122, such as regions deemed more likely to be relevant; predefined regions such as a window, an active window, or a menu bar of a window; or regions defined by content type. For example, active window 110 may be deemed more relevant to the user of computing device 100 than inactive window 112, and so screen region detection engine 202 may identify active window 110 as one of regions 212.

A predefined region may be defined based on screenshot metadata 124. For example, screenshot metadata 124 may include the location and dimensions of a title bar of a window, which may be used to define one of regions 212.

Content type based regions may be defined by regions of text, pictures, diagrams, and other forms of content. For example, screen region detection engine 202 may identify region 212 as a portion of screenshot 122 that is predominantly text, predominantly table-based data, predominantly image-based data, etc.

Screen region detection engine 202 may generate region metadata 252, which represents information about a particular region. For example, region metadata 252 may include a reference to screenshot 122, a size and location within screenshot 122, a content type, and properties that are specific to the content type of the region. For instance, a region that contains an image may include the dimensions of the image in region metadata 252. A region that contains an application window may include the name of the window in region metadata 252.

As discussed briefly above, regions 212 are identified to more precisely tailor user history queries to particular pieces of content. Region metadata 252 may be stored in relational database 248 and used when querying user knowledge store 240. For example, region metadata 252 may be used to limit a query to content found in a word processing document, or to limit a query to content that was submitted with a web form.

Region metadata 252 may also be used to highlight a relevant portion of a search result. For example, the size and location of region 212 may be obtained from region metadata 252 and used to construct a visual highlight of region 212 within screenshot 122.

In some configurations, data identified within one of regions 212 may be used to determine what text of text 214 will be used to create text embeddings 234. For example, a menu bar region of an application may contain text, but text embedding generator 224 may determine that the menu bar region is a "navigation element" and not part of the substantive content of screenshot 122. As such, the contents of the menu bar may be skipped when creating text embeddings 234.

Visual embedding generator 222 includes model 223-*a* machine learning model configured to receive regions of screenshot 122 and generate corresponding visual embeddings 232. Model 223 may be an embedding model or a feature extractor model. Model 223 may use a convolutional neural network architecture or a transformer-based architecture. Visual embedding 232 is stored in visual screenshot index 242, which may be a vector database or similar data structure that maps a visual embedding 232 to a corresponding screenshot 122 and/or region 212 of screenshot 122.

Screenshot 122 is also processed by optical character recognition engine 204, which outputs text 214. In some configurations, the content of text 214 and the location of text 214 in screenshot 122 may be used to inform screen region detection engine 202, e.g., by helping to identify relevant regions of screenshot 122. Similarly, regions 212 that are identified by screen region detection engine 202 as containing text may inform how optical character recognition engine 204 analyzes screenshot 122, e.g., by focusing on regions that include text.

Text 214 may be used by text embedding generator 224 to generate text embeddings 234. Text embedding generator 224 may utilize machine learning model 225 to infer text embeddings 234 from text 214. In some examples, machine learning model 225 is a different model than machine learning model 223, although models 223 and 225 may be similar or the same, or have different, similar, or the same embedding spaces.

In some configurations, text embedding generator 224 processes text 214 that corresponds to one of regions 212 rather than all of the text extracted from a particular screenshot 122. Text embeddings 234 may be stored in text and metadata index 244, which may be a vector database or other data structure designed to map text embeddings to corresponding screenshots or corresponding regions of screenshots. Additionally, or alternatively, text embeddings 234 may be stored in relational database 248.

For example, text embedding generator 224 may generate an embedding for a window title of a running application. The embedding of the window title may be stored in text and metadata index 244, while the text of the window title is stored in full text index 250. This allows searching for the text of the window title itself as part of full text index 250 as well as searching text and metadata index 244 for a semantic match of the text of the title.

Text 214 may also be stored directly in full text index 250 of relational database 248. Full text index 250 allows user history queries to be performed against some or all of the text found in screenshot 122, which may yield different results than a semantic lookup with text and metadata index 244.

Text 214 may also be provided to named entity recognition engine 226, which applies natural language processing techniques to extract named entities 236. Named entities 236 may be added as properties to an entry for screenshot 122 or screenshot region 212 in relational database 248. Screenshot metadata 124 may also be stored in the record in relational database 248 that corresponds to screenshot 122 or one of regions 212 of screen shot 122.

Screenshot 122 may itself be stored directly in screenshot store 246 of user knowledge store 240. Screenshot 122 may be used to generate results to user history queries, enabling a user to visualize the state of their computing device at a time when screenshot 122 was taken.

FIG. 3 illustrates regions identified within a screenshot and text extracted from the screenshot. Text region 310 of screenshot 122 is one of regions 212 identified by screen region detection engine 202. Similarly, image regions 312A and 312B are image regions found within screenshot 122.

Text 314 represents the full text extracted from screen shot 122 by optical character recognition engine 204, including text from text region 310 and text from the sign in image region 312A. Named entities 336 is one example of named entities 236 extracted from text 314 by named entity recognition engine 226.

Figure 4:
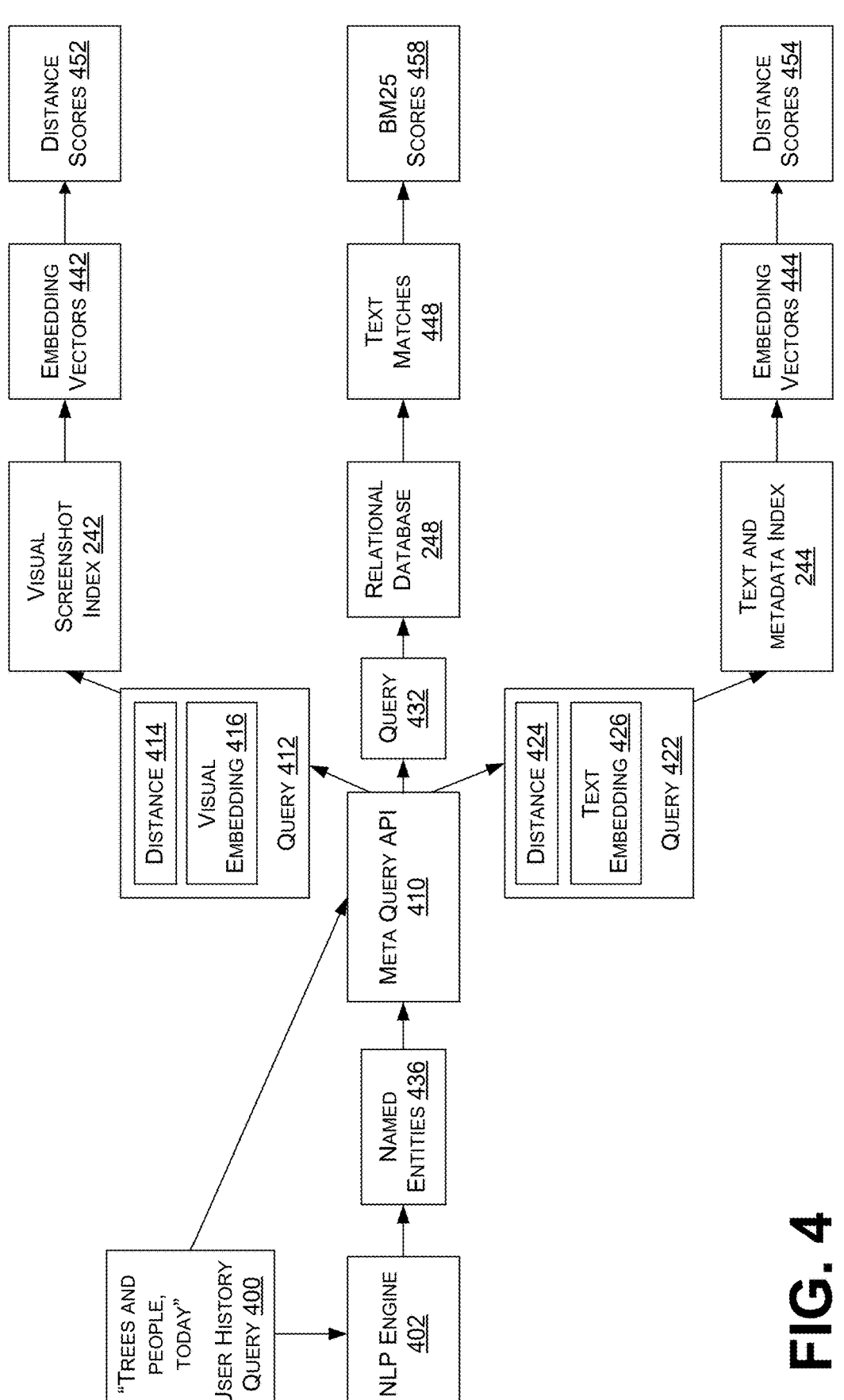
FIG. 4 illustrates querying screenshot indices.

FIG. 4 illustrates querying screenshot indices. User history query 400, "trees and people, today" is one example of a query for which responsive results may be found in visual screenshot index 242, full text index 250 of relational database 248, and/or text and metadata index 244. Query 400 may be analyzed by natural language processing engine 402 to identify named entities 436, such as file names, date and time constraints, application names, and other elements that may affect the search. In this example, "today" is an example of a named entity that may be used to constrain query results to a particular period of time.

Named entities 436 are provided to metaquery API 410, along with user history query 400. Metaquery API 410 applies user history query 400 to multiple indices. As illustrated, query 412 is generated by metaquery API 410 and provided to visual screenshot index 242. Query 412 includes defined distance 414 and visual embedding 416. Visual embedding 416 is an embedding vector representation of query 400 generated by machine learning model 223—the same machine learning model that was used to populate visual screenshot index 242, or another model that has the same or approximately the same embedding space. In some configurations, embedding vectors 442 of visual screenshot index 242 are identified as being within defined distance 414 of visual embedding 416. In other configurations, a top N closest visual embeddings, or a top N closest visual embeddings within the defined distance 414 are identified as embedding vectors 442. Embedding vectors 442 may be used to generate distance scores 452, e.g., by computing distances of embedding vectors 442 to visual embedding 416.

Query 422, which is provided to text and metadata index 244, includes defined distance 424 and text embedding 426. Text embedding 426 is an embedding vector generated by machine learning model 225 from user history query 400. In some configurations, screenshot embedding vectors of text and metadata index 244 that are within defined distance 424 of text embedding 426 are identified as embedding vectors 444. Text and metadata index 244 may also identify a top N closest embeddings of screenshots within defined distance 424 of text embedding 426 as embedding vectors 444. Embedding vectors 444 are used to compute distance scores 454. Distance scores 454 are computed by finding the distances between embedding vectors 444 and text embedding 426.

In some configurations, user history query 400, and optionally named entities 436, are used to generate query 432. Query 432 is provided to relational database 248 to identify relevant screenshots. Query 432 may include a full text query based on user history query 400, and which is processed by full text index 250. Additional constraints may be added to query 432, such as constraints set by a user interface that generates user history query 400, or constraints inferred from named entities 436. Examples of constraints set by a user interface limit results to screenshots of a particular application, or within a certain period of time, etc. Relational database 248 returns text matches 448 of screenshots that match the full text search of user history query 400 and which satisfy the constraints received from the user or inferred from named entities 436. BM25 scores 458 are numeric values that indicate how close text found in full text index 250 is to query 432.

As discussed briefly above, visual screenshot index 242 and text and metadata index 244 may not be able to filter out results. In some configurations, this limitation is overcome by applying the constraints of query 432 to the embeddings 442 identified by visual screenshot index 242 and the embeddings 444 identified by text and metadata index 244.

Figure 5:
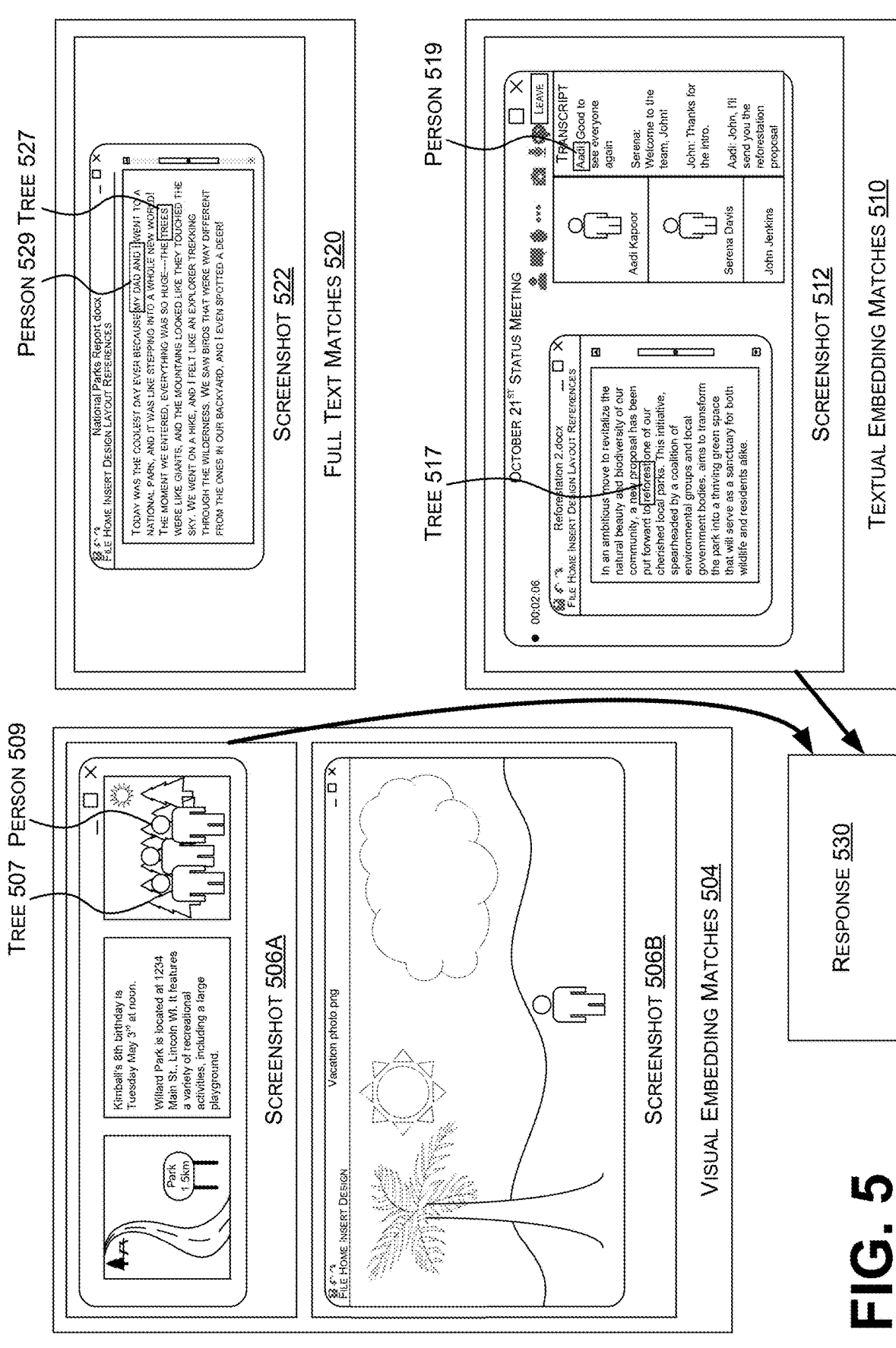
FIG. 5 illustrates merging per-index search results into a response to a user history query.

FIG. 5 illustrates merging per-index search results into a response to a user history query. Visual embedding matches 504 are screenshots 506 that were used to generate the embeddings 442 returned from visual screenshot index 242. Similarly, textual embedding matches 510 includes screenshots 512 that were used to generate the embeddings 444 returned from text and metadata index 244. Full text matches 520 contains screenshots 522 associated with text matches 448 identified by relational database 248.

Figure 6:
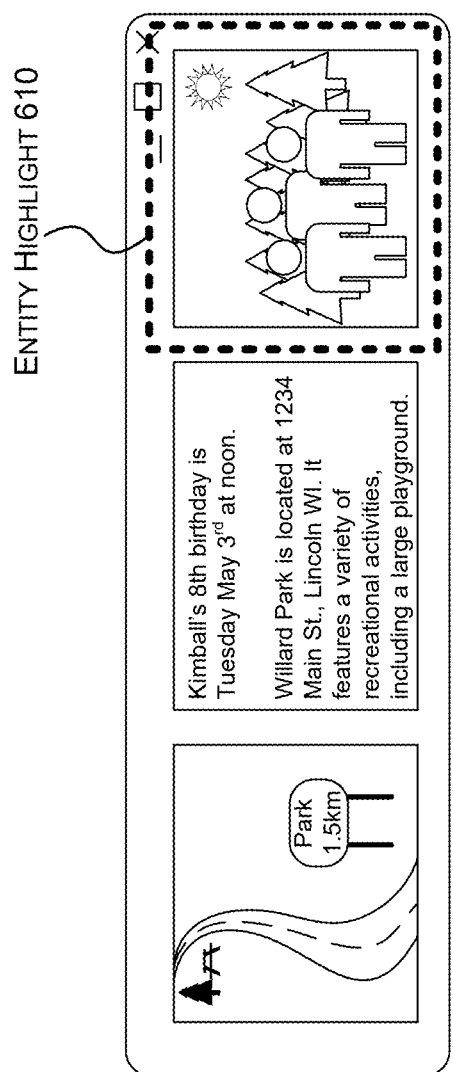
FIG. 6 illustrates highlighting a region of a screenshot that satisfied a user history query.

Also illustrated are entities within the screen shots that match user history query 400. Specifically, tree 507 and person 509 of screenshot 506 are examples of portions of screenshot 506A that match with query 400: "tree and person, today". Similarly, tree 517 and person 519 are examples of text that matches query 400 in screenshot 512 while tree 527 and person 529 are examples of text that matches query 400 in screenshot 522. Elements that match query 400 within a screenshot may be highlighted in order to convey to the user why the screenshot was a match, as illustrated in FIG. 6.

In the illustrated example, screenshot 506A and screenshot 512 are selected for inclusion in response 530. The screenshots may be selected by weighting their associated scores and ranking them. Screenshots identified by visual screenshot index 242 may be associated with a closeness score 452 that indicates how close embedding 442 was to visual embedding 416. Screenshot 512 may be associated with a similar score that indicates how close embedding 444 was to text embedding 426, as determined by text and metadata index 244. Screenshot 522 may be associated with a string distance score 458 generated by relational database 248 or full-text index 250, such as BM25. Although all three scores indicate a better match with a smaller number, scores from three different indices often may not be directly comparable because they are not normalized and because the range of possible scores may be different if not completely disjoint. As such, in some configurations these scores are normalized to a range of zero to one.

In some configurations, screenshots with the same normalized score are interpreted as having approximately the same relevance to user history query 400. In other configurations, the scores may be weighted based on the context in which query 400 was received, such as a screenshot search or a file search. For example, a query with the term "image", such as "image of a red barn I saw yesterday", may weigh the score obtained from screenshot index 242 higher than scores obtained from text-based indices.

In some configurations, two or more indices return the same screenshot, indicating an increased association between query 400 and that screenshot. In these scenarios, scores may be combined in a way that accounts for this increased relevance. For example, the scores from each index that identified a particular screenshot may be averaged. Additionally, or alternatively, a bonus may be added to the score of a screenshot that was identified in multiple indices. For example, the score may be increased by a fixed amount, or the score may be increased by a percentage. In this way, the highest scoring screenshots are selected based on the search results generated by multiple indices.

FIG. 6 illustrates highlighting a region of a screenshot that satisfied a user history query. In this example, highlight 610 highlights a region 212 of screenshot 122 that contains trees and people, which satisfies user history query 400. The position, size, and shape of highlight 610 may be determined using metadata 124, region metadata 252, named entities 236, and other metadata about content identified within screenshot 122. Continuing the example, entity highlight 610 may have size and location defined by region metadata 252 that defines the location and extent of the highlighted region 212 of screenshot 122.

In some configurations, metaquery API 410 looks for visual representations of named entities 436 in the screenshots obtained from visual screenshot index 242, text and metadata index 244, and relational database 248. Examples depicted in FIG. 5 include trees 507, 517, and 527, and persons 509, 519, and 529. Information conveying the location and size of these entities may be transmitted to a display component that renders highlight 610 on a depiction of screenshot 122.

Figure 7:
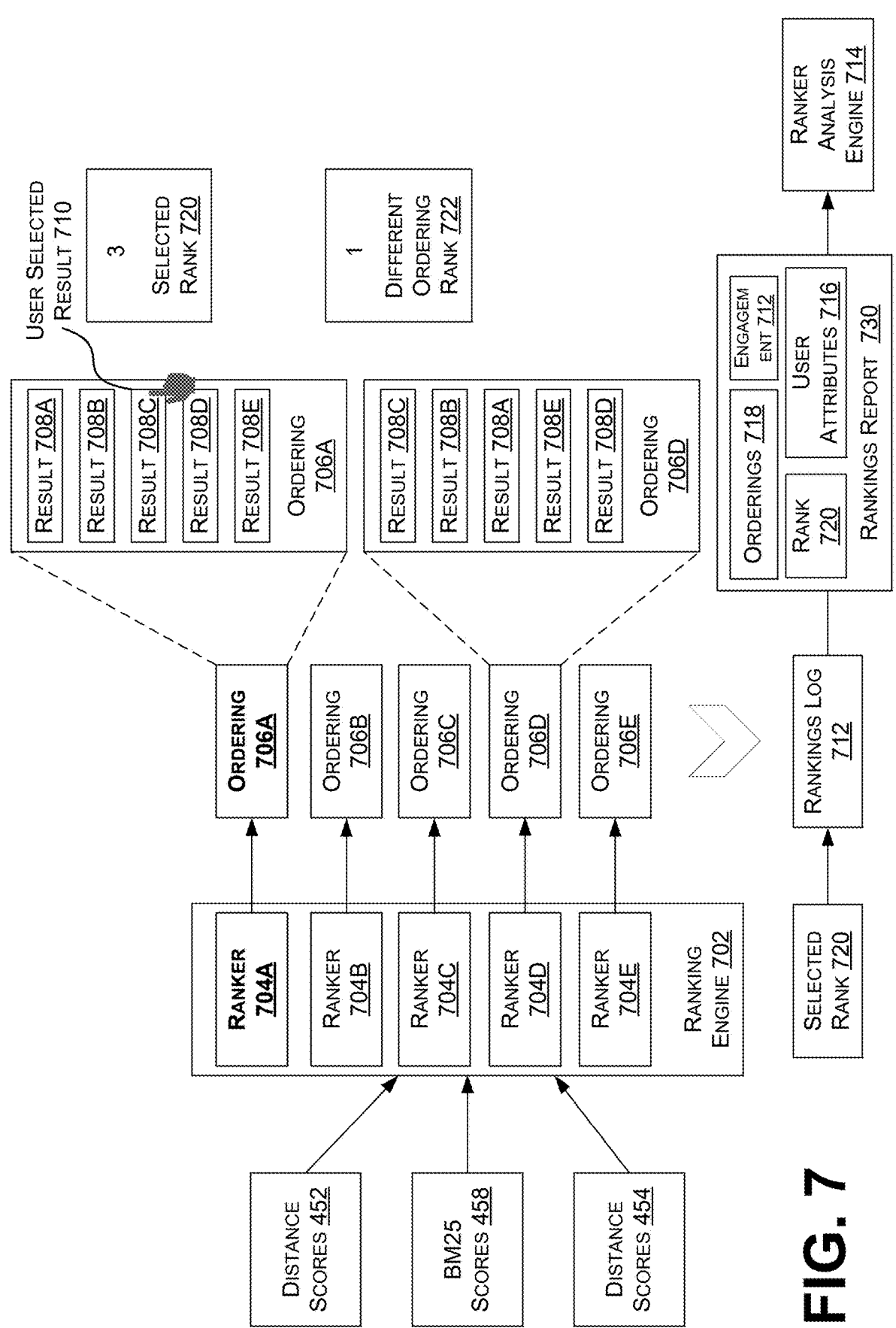
FIG. 7 illustrates applying multiple rankers to generate multiple orderings of search results.

FIG. 7 illustrates applying multiple rankers to generate multiple orderings of search results. In one configuration, the search results are screenshots or embedding vectors of screenshots obtained from a collection of screenshots of a computing device. However, the same or similar techniques may be applied to files in local storage, web searches, or any other type of search. As illustrated in FIGS. 2-6, screenshots 122 are indexed in user knowledge store 240. While user knowledge store 240 is illustrated with three indices, allowing screenshots to be indexed in three different ways, any number and type of indices is similarly contemplated. Furthermore, as discussed below in conjunction with FIG. 8, multiple indexing pipelines may apply different indexing techniques to screenshots 122 in order to generate multiple user knowledge stores with different understandings of screenshots 122.

Distance scores 452 and 458 and BM25 scores 458 are received by ranking engine 702. Ranking engine 702 applies search pipelines in part with rankers 704. Rankers 704 generate search result orderings 706 from the received scores. Rankers 704 attempt to order search results in a way that achieves the best user engagement. User engagement may be measured in a number of ways, including how frequently the user clicks on the top result, how frequently the user clicks on any result, explicit user feedback such as a thumbs-up or thumbs-down indication, the mean reciprocal rank (MRR), and/or other statistics that measure which entries of response 530 are invoked and at what frequency. User engagement may also be measured by the depth of interaction with a screenshot. For example, the amount of time spent engaged with the screenshot, whether the user restores the application depicted in the screenshot to a previous state, etc.

Each ordering 706 arranges search results 708 in response 530 as they will be displayed to the user. In some configurations, each entry in the list of search results is associated with a ranking. For example, the top search result—the result that is predicted to be the most relevant to the user and therefore most likely to be engaged with—may be associated with the rank of '1'. However, other ranking schemes are similarly contemplated.

A ranker 704 may take a number of factors into consideration when ordering search results 708. In some configurations, rankers 704 adjust the weights assigned to scores 452, 454, and 458. For example, ranker 704A may weigh screenshots identified by visual screenshot index 242 more than screenshots identified based on text matches, and increase the weights applied to scores 452 of embedding vectors 442 accordingly. At the same time, ranker 704D may weigh screenshots identified by full-text search more, increasing the weights applied to scores 458 of embedding vectors 448.

Rankers 704 may also conditionally adjust weights, such as in response to the content of user history query 400. For example, rankers 704 may weigh visual embedding-based screenshots more than text embedding-based screenshots when particular image-related named entities 436 are identified within user history query 400.

Some rankers may explicitly select at least one or two of the top results from each source index to be included in response 530. This ensures that at least some results from each type of index are made available to users.

In some configurations, one of rankers 704 is selected as a default ranker. The default ranker is the ranker used to order search results in response 530. As illustrated, ranker 704A is the default ranker, and so ordering 706A is used to generate response 530. Specifically, response 530 lists results 708A-708E in that order.

Some or all of the orderings 706 generated by rankers 704 are stored in rankings log 712. Rankings log 712 maintains orderings 706 generated by each ranker 704 for each response 530. Rankings log 712 may also store selected rankings 720. Selected rankings 720 are rankings within responses 530 of user selected results 710. For example, if the user selected result 710 is result 708C, and if rankings are assigned starting at "1" for the top search result and increase for each entry, then selected rank 720 would be "3".

When a user interaction indicates engagement with one or more of search results 708, ranker analysis engine 714 may use rankings log 712 to determine if any of the non-default orderings 706 would have been more engaging, as described in additional detail below. For example, rankings report 730 may provide ranker analysis engine 714 with result orderings for each of rankers 704A-704E and selected rank 720.

Rankings report 730 may optionally include user attributes 716, which may be used to classify users in order to assign a ranker 704 to a class of users that improves their engagement. For example, user attributes may include demographic information, location information, IP address, OS configurations, or other data with which users may be classified. Ranker analysis engine 714 may use user attributes 716 from many user interactions with responses 530 to identify patterns in ranker engagement. For example, if users that live in a particular region of the world appear to engage more with results obtained from visual screenshot index 242, then the default ranker for this region may be adjusted to increase the weights applied to scores from visual screenshot index 242.

Rankings report 730 may also include engagement score 712—an indication of how much engagement the user had with user selected result 710. As discussed herein, engagement may include hovering over a search result 708 listed by response 530, activating a search result 708, engaging with a screenshot associated with a search result 708 for a particular length of time, restoring an application depicted in the screenshot to an earlier state, etc. Engagement score 712 may be used when evaluating the effectiveness of rankers 704. For instance, rankers 704 that generate orderings 706 with higher amounts of engagement are more likely to be made the default ranker.

Rankers 704B-704E are non-default ranking algorithms that are run in the background in parallel search pipelines. In response to user engagement with response 530, ranker analysis engine 714 may determine if any of the non-default rankers 704B-704E would have produced an ordering 706 that was more engaging. In some configurations, it is assumed that results listed towards the top of response 530 elicit more engagement. Therefore, rankers that place the most desired results highest are expected to create the most engagement. However, the disclosed embodiments apply equally to other expectations of what drives engagement. As illustrated, user selected result 710 had a selected rank of "3" in ordering 706A, but would have had different ordering rank 722 of "1" in ordering 706D. Ranker analysis engine may decide to modify or replace ranker 704A as the default ranker with ranker 704D if ordering 706D tends to produce higher rankings of selected search results. The number of ranking algorithms depicted in FIG. 7 is illustrative and not limiting—any number of ranking algorithms is similarly contemplated.

Figure 8:
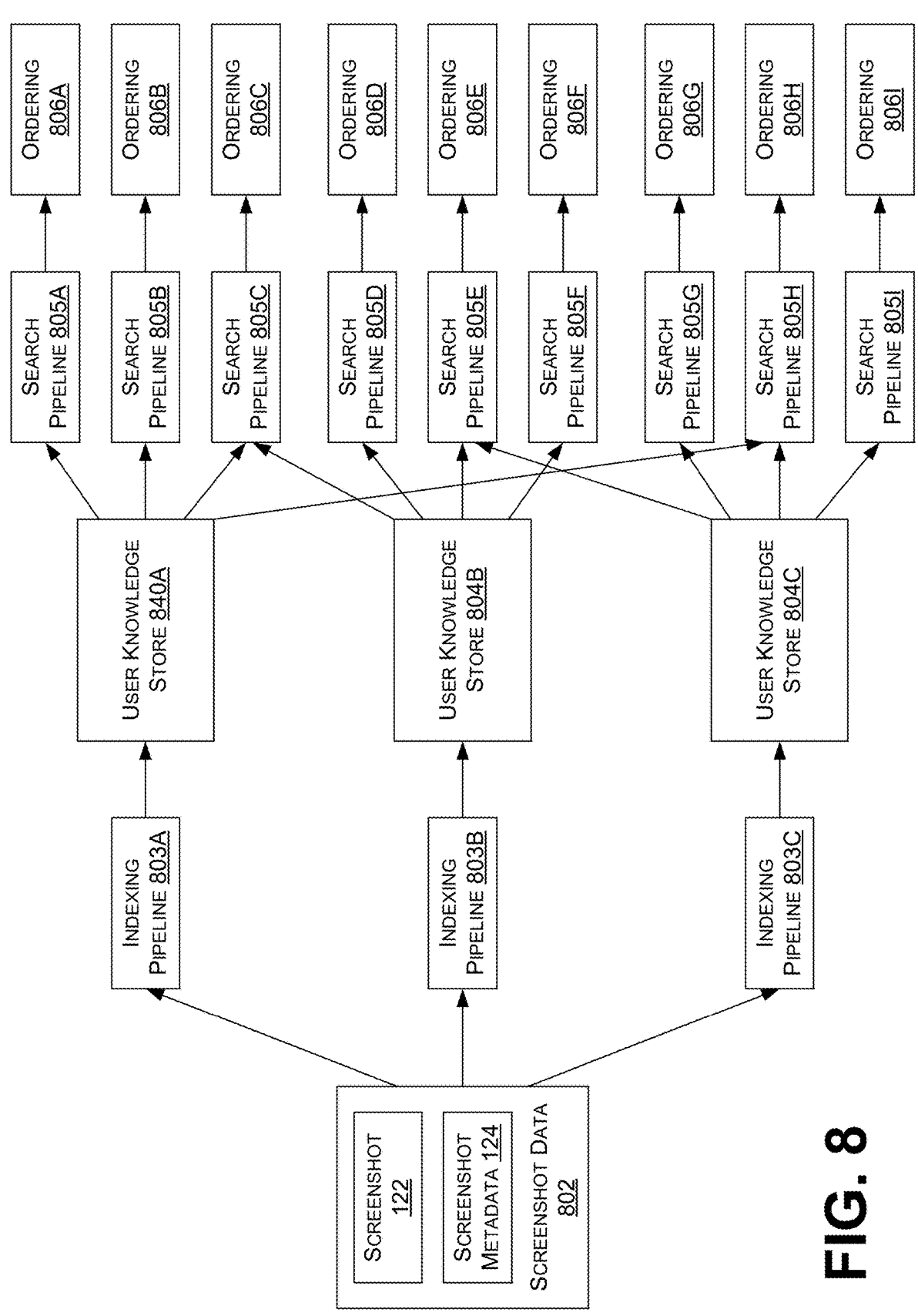
FIG. 8 illustrates using multiple indexing pipelines and search pipelines on screenshot data in parallel to generate multiple search result orderings.

FIG. 8 illustrates using multiple search pipelines 805 consuming data generated from one or more indexing pipelines 803. Indexing pipelines 803 may operate on screenshot data 802 in parallel to generate multiple user knowledge stores 840. In some configurations, each user knowledge store 840 stores screenshot embedding indices that are generated with the different parameters according to the different indexing pipelines 803. However, additionally, or alternatively, multiple indexing pipelines 803 may generate data that is stored in a single knowledge store 840.

Indexing pipelines 803 define how raw screenshot data 802 is processed to generate embeddings, full text indices, relational databases, and/or other techniques for processing screenshots 122. FIG. 2 illustrates one example of an indexing pipeline. Indexing pipelines 803 may be substantially similar to each other or vary considerably. For example, one indexing pipeline 803A may generate visual embeddings based on entire screenshots. Another indexing pipeline 803B may generate visual embeddings based on regions 212 of screenshots 122. Some indexing pipelines 803 may generate multiple indices, while others may generate a single index. Some indexing pipelines 803 may generate indices independently of each other, while others use the output of some indices to determine how to generate other indices.

Indexing pipelines 803 may also customize the amount and type of screenshot metadata that is stored, the conditions placed on relational database queries and the conditions used to filter out embeddings from embedding indices such as visual screenshot index 242 or text and metadata index 244.

Indexing pipelines 803 may also customize the named entities 436 that are identified within user history query 400, the number, type, and size of machine learning models 223 or 225 used to generate embeddings, the distances from embeddings that are considered relevant search results, full text index similarity thresholds, and the like.

Search pipelines 805 may consume screenshot index data from one or more of user knowledge stores 840 in order to generate orderings 806. One example of a search pipeline is discussed above in conjunction with FIG. 4. As illustrated, search pipeline 805A obtains index data from user knowledge store 840A, while search pipeline 805C obtains index data from user knowledge stores 840A and 840B.

The process described above in conjunction with FIG. 7 for determining that a non-default ranker may provide more engaging orderings may be applied generally to the selection of indexing pipelines 803 in conjunction with selection of search pipelines 805. For example, various combinations of candidate indexing pipelines 803 and candidate search pipelines 805 may be used in parallel to generate multiple orderings 806 for search results. In response to a user engagement with one of the search results, the ranking of the selection according to the default search pipeline 805A is compared to the ranking of the selection according to the non-default search pipelines 805B-805I. If a non-default search pipeline that pulls data from one or more of user knowledge stores 840 consistently ranks selected search results higher than the default search pipeline, then the default search pipeline 805A may be modified or replaced. In this way, multiple configurations of search pipelines 805 consuming data generated by multiple indexing pipelines 803 may be evaluated on a per-user basis, without exporting sensitive user data off of the user's device.

Figure 9:
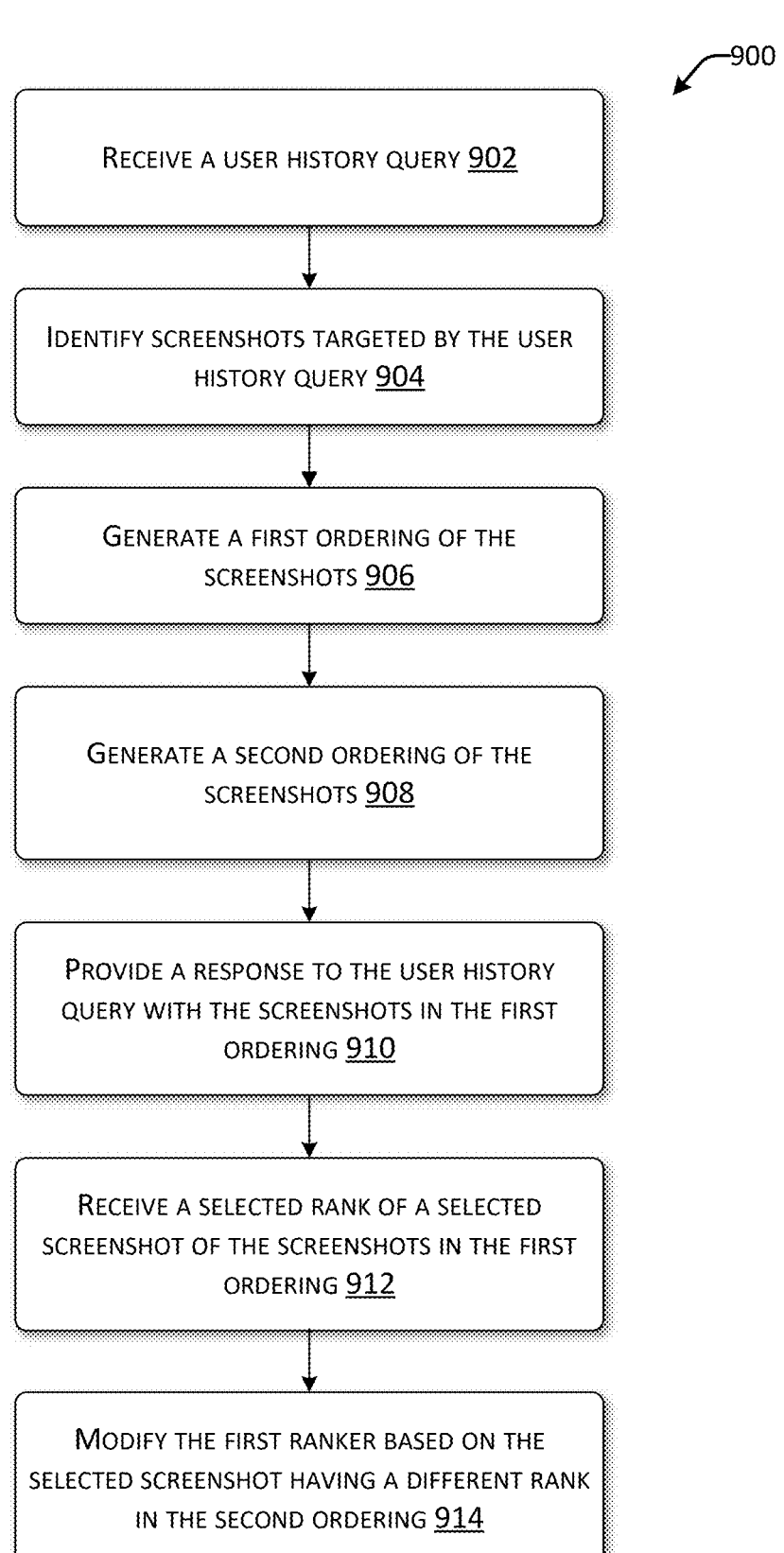
FIG. 9 is a flow diagram of an example method for in production parallel pipeline evaluations.

FIG. 9 is a flow diagram of an example method for in production parallel pipeline evaluations. Routine 900 begins at operation 902, where user history query 400 is received.

Routine 900 continues at operation 904, where screenshots 122 targeted by the user history query 400 are identified, as discussed above in conjunction with FIG. 4.

Routine 900 continues at operation 906, where a first ordering 704A of screenshots 122 is generated. For example, ranking engine may use a first ranker 704A to generate ordering 706A of results 708. In some configurations, ranker 704A is defined by search pipeline 806A, a default search pipeline.

Routine 900 continues at operation 908, where a second ordering of screenshots 122 is generated. In some configurations, one or more of non-default rankers 704B-704E, for example, generate orderings 706A-706B. Non-default rankers 704B-704E may each, some, or all be defined by one or more non-default search pipelines 806. These non-default search pipelines may also include other characteristics as discussed above in conjunction with FIG. 8.

Routine 900 continues at operation 910, where response 530 is provided to user history query 400. Response 530 orders results 708 according to the first ordering 706A of the default ranker 704A.

Routine 900 continues at operation 912, where a selected rank 720 of a selected search result 708C is received.

Routine 900 continues at operation 914, where the first ranker 704A is modified or replaced based on the selected screenshot 708C having a different rank in the second ordering 706D.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 900 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routines 900 may be also implemented in many other ways. For example, the routine 900 may be implemented, at least in part, by a processor of another remote computer or a local circuit. In addition, one or more of the operations of the routine 900 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 10:
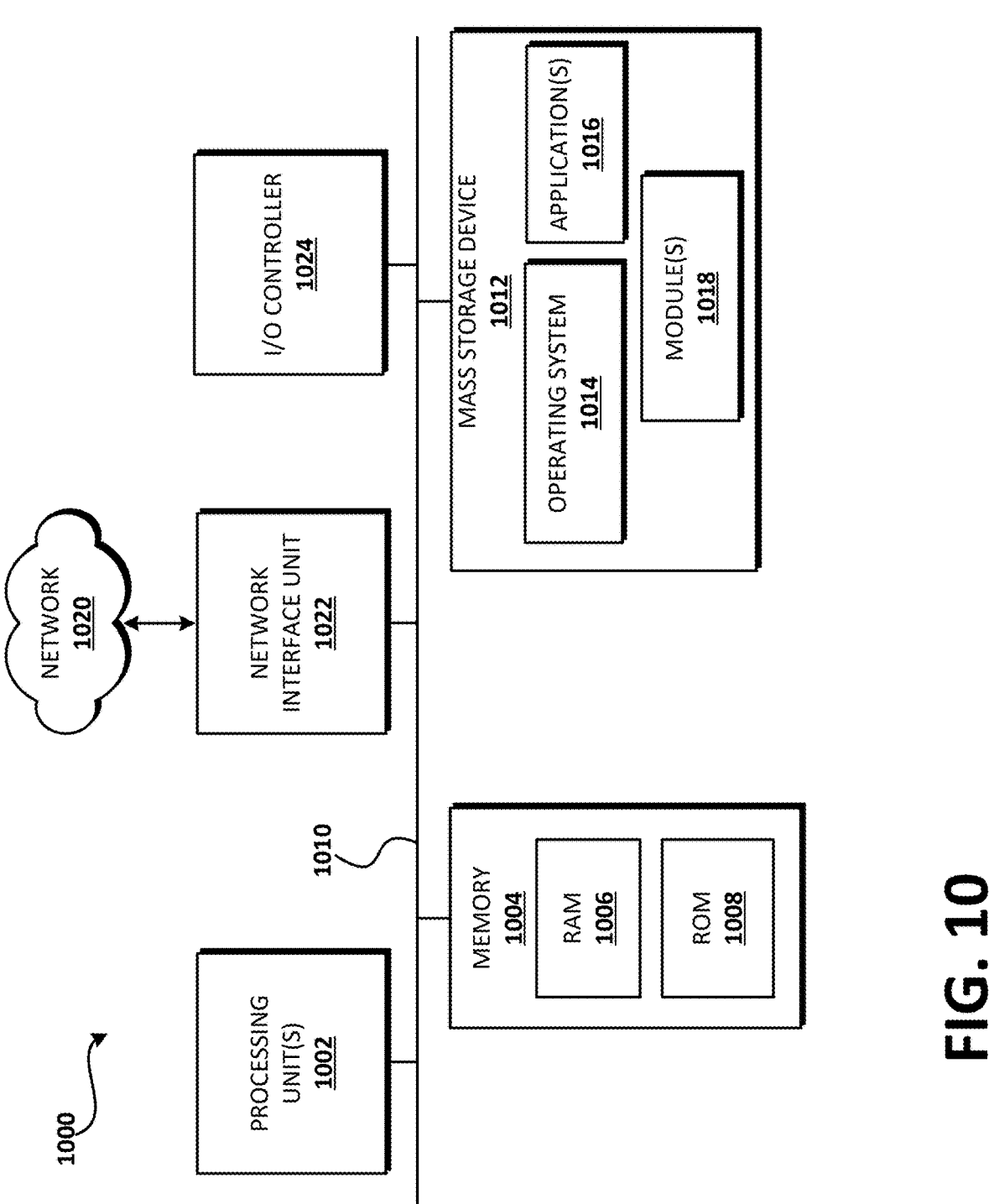
FIG. 10 is a computer architecture diagram illustrating an illustrative computer hardware and software architecture for a computing system capable of implementing aspects of the techniques and technologies presented herein.

FIG. 10 shows additional details of an example computer architecture 1000 for a device, such as a computer or a server configured as part of the systems described herein, capable of executing computer instructions (e.g., a module or a program component described herein). The computer architecture 1000 illustrated in FIG. 10 includes processing unit(s) 1002, a system memory 1004, including a random-access memory 1006 ("RAM") and a read-only memory ("ROM") 1008, and a system bus 1010 that couples the memory 1004 to the processing unit(s) 1002.

Processing unit(s), such as processing unit(s) 1002, can represent, for example, a CPU-type processing unit, a GPU-type processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), Neural Processing Unites (NPUs) etc.

A basic input/output system containing the basic routines that help to transfer information between elements within the computer architecture 1000, such as during startup, is stored in the ROM 1008. The computer architecture 1000 further includes a mass storage device 1012 for storing an operating system 1014, application(s) 1016, modules 1018, and other data described herein.

The mass storage device 1012 is connected to processing unit(s) 1002 through a mass storage controller connected to the bus 1010. The mass storage device 1012 and its associated computer-readable media provide non-volatile storage for the computer architecture 1000. Although the description of computer-readable media contained herein refers to a mass storage device, it should be appreciated by those skilled in the art that computer-readable media can be any available computer-readable storage media or communication media that can be accessed by the computer architecture 1000.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 1000 may operate in a networked environment using logical connections to remote computers through the network 1020. The computer architecture 1000 may connect to the network 1020 through a network interface unit 1022 connected to the bus 1010. The computer architecture 1000 also may include an input/output controller 1024 for receiving and processing input from a number of other devices, including a keyboard, mouse, touch, or electronic stylus or pen. Similarly, the input/output controller 1024 may provide output to a display screen, a printer, or other type of output device.

It should be appreciated that the software components described herein may, when loaded into the processing unit(s) 1002 and executed, transform the processing unit(s) 1002 and the overall computer architecture 1000 from a general-purpose computing system into a special-purpose computing system customized to facilitate the functionality presented herein. The processing unit(s) 1002 may be constructed from any number of transistors or other discrete circuit elements, which may individually or collectively assume any number of states. More specifically, the processing unit(s) 1002 may operate as a finite-state machine, in response to executable instructions contained within the software modules disclosed herein. These computer-executable instructions may transform the processing unit(s) 1002 by specifying how the processing unit(s) 1002 transition between states, thereby transforming the transistors or other discrete hardware elements constituting the processing unit(s) 1002.

The present disclosure is supplemented by the following example clauses:

Example 1: A method comprising: receiving a user history query; identifying a plurality of screenshots targeted by the user history query; generating, with a first ranker, a first ordering of the plurality of screenshots; generating, with a second ranker, a second ordering of the plurality of screenshots; providing a response to the user history query comprising the plurality of screenshots in the first ordering; receiving a selected rank of a selected screenshot of the plurality of screenshots in the first ordering; and modifying the first ranker based in part on a determination that the selected screenshot has a different ordering rank in the second ordering.

Example 2: The method of Example 1, wherein modifying the first ranker comprises replacing the first ranker with the second ranker.

Example 3: The method of Example 1, wherein the selected screenshot was selected by a user that has an attribute, and wherein the first ranker is modified based on a determination that other users that have the attribute selected the selected screenshot.

Example 4: The method of Example 1, wherein the selected rank is lower than the other ordering rank.

Example 5: The method of Example 1, wherein the plurality of screenshots is identified from a collection of screenshots of a computing device that were taken over time.

Example 6: The method of Example 1, further comprising: logging the first ordering and the second ordering; logging the selected rank and the different rank; providing the first ordering, the second ordering, the selected rank, and the different rank to a ranker analysis engine; and receiving an indication to modify the first ranker from the ranker analysis engine.

Example 7: The method of Example 6, further comprising: providing an attribute of a user that selected the selected screenshot to the ranker analysis engine, wherein the indication to modify the first ranker is provided to computing devices operated by users that have the attribute.

Example 8: A system comprising: a processing unit; and a computer-readable storage medium having computer-executable instructions stored thereupon, which, when executed by the processing unit, cause the processing unit to: receive a search query at a computing device; identify a plurality of search results stored on the computing device that are targeted by the search query; generate, with a first ranker, a first ordering of the search results; generate, with a second ranker, a second ordering of the search results; generate a response to the search query comprising the plurality of search results in the first ordering; receive a selected rank of a selected search result of the plurality of search results in the first ordering; and modify the first ranker based in part on a determination that the selected screenshot has a different ordering rank in the second ordering.

Example 9: The system of Example 8, wherein the search query targets a file system of the computing device.

Example 10: The system of Example 8, wherein the search query targets screenshots of a computing device that were taken over time.

Example 11: The system of Example 8, wherein the search query targets web pages stored on the computing device.

Example 12: The system of Example 11, wherein the computing device comprises a first computing device, wherein individual rankings and selected ranks are transmitted to a second computing device that determines whether to modify the first ranker, and wherein the plurality of search results are not transmitted to the second computing device.

Example 13: The system of Example 8, wherein the selected search result is ranked higher in the first ordering than the second ordering.

Example 14: The system of Example 8, wherein the first ranker and the second ranker operate on the computing device.

Example 15: A computer-readable storage medium having encoded thereon computer-readable instructions that when executed by a processing unit causes a system to: receive a user history query; identify a first plurality of screenshots targeted by the user history query using a first search pipeline; identify a second plurality of screenshots targeted by the user history query using a second search pipeline; generate, with a ranker, a first ordering of the first plurality of screenshots; generate, with the ranker, a second ordering of the second plurality of screenshots; provide a response to the user history query comprising the first plurality of screenshots in the first ordering; receive a selected rank of a selected screenshot of the first plurality of screenshots in the first ordering; and modify the first search pipeline based in part on a determination that the selected screenshot has a different ordering rank in the second ordering.

Example 16: The computer-readable storage medium of Example 15, wherein the second ordering of the second plurality of screenshots is generated with a second ranker.

Example 17: The computer-readable storage medium of Example 15, wherein the first search pipeline identifies the first plurality of screenshots based on a comparison of a query embedding of the user history query to a screenshot region embedding of a region of a screenshot.

Example 18: The computer-readable storage medium of Example 17, wherein the second search pipeline identifies the second plurality of screenshots based on a comparison of the query embedding of the user history query to a screenshot embedding of the screenshot.

Example 19: The computer-readable storage medium of Example 15, wherein the first ordering and the second ordering are generated in parallel.

Example 20: The computer-readable storage medium of Example 15, wherein the user knowledge store includes a first screenshot index and a second screenshot index, wherein the first search pipeline applies a first ranking weight to screenshots identified from the first screenshot index and a second ranking weight to screenshots identified from the second screenshot index, and wherein the second search pipeline applies a third ranking weight to screenshots identified from the first screenshot index and a fourth ranking weight to screenshots identified from the second screenshot index.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
receiving a query of a user history of user interactions with a computing device;
identifying a plurality of screenshots targeted by the query;
generating a first ordering of the plurality of screenshots and a second ordering of the plurality of screenshots, wherein the first ordering is generated with a first ranker, wherein the second ordering is generated with a second ranker, and wherein the second ranker generates the second ordering independently of the first ranker generating the first ordering;
displaying, on the computing device, two or more of the plurality of screenshots according to the first ordering;
receiving a rank of a user selected screenshot according to the first ordering;

modifying the first ranker based in part on a determination that the user selected screenshot has a different rank in the second ordering; and
executing another query of the user history with the modified first ranker to provide another ordered plurality of screenshots.

2. The method of claim 1, wherein modifying the first ranker comprises replacing the first ranker with the second ranker.

3. The method of claim 1, wherein the user selected screenshot was selected by a user that has an attribute, and wherein the first ranker is modified based on a determination that other users that have the attribute selected the selected screenshot.

4. The method of claim 1, wherein the received rank is lower than the different rank.

5. The method of claim 1, wherein the plurality of screenshots is identified from a collection of screenshots of the computing device that were taken over time.

6. The method of claim 1, further comprising:
logging the first ordering and the second ordering;
logging the received rank and the different rank;
providing the first ordering, the second ordering, the received rank, and the different rank to a ranker analysis engine; and
receiving an indication to modify the first ranker from the ranker analysis engine.

7. The method of claim 6, further comprising:
providing an attribute of a user that selected the user selected screenshot to the ranker analysis engine, wherein the indication to modify the first ranker is provided to computing devices operated by users that have the attribute.

8. A system comprising:
a processing unit; and
a computer-readable storage medium having computer-executable instructions stored thereupon, which, when executed by the processing unit, cause the processing unit to:
receive a query of a user history of user interactions with a computing device;
identify a plurality of query results stored on the computing device that are targeted by the query;
generate a first ordering of the plurality of query results and a second ordering of the plurality of query results, wherein the first ordering is generated with a first ranker, wherein the second ordering is generated with a second ranker, and wherein the second ranker generates the second ordering independently of the first ranker generating the first ordering;
generate a response to the query comprising the plurality of query results in the first ordering;
receive a rank of a user selected query result of the plurality of query results in the first ordering;
modify the first ranker based in part on a determination that the user selected query result/results has a different rank in the second ordering; and
execute another query of the user history with the modified first ranker to provide another ordered plurality of query result/results.

9. The system of claim 8, wherein the query targets a file system of the computing device.

10. The system of claim 8, wherein the query targets screenshots of the computing device that were taken over time.

11. The system of claim 8, wherein the query targets web pages stored on the computing device.

12. The system of claim 11, wherein the computing device comprises a first computing device, wherein the first ordering, the second ordering, and the received rank are transmitted to a second computing device that determines whether to modify the first ranker, and wherein the plurality of query results are not transmitted to the second computing device.

13. The system of claim 8, wherein the user selected query result is ranked higher in the first ordering than the second ordering.

14. The system of claim 8, wherein the first ranker and the second ranker operate on the computing device.

15. A computer-readable storage medium having encoded thereon computer-readable instructions that when executed by a processing unit causes a system to:

receive a query of a user history of interactions with a computing device;

identify a first plurality of screenshots targeted by the query using a first search pipeline;

identify a second plurality of screenshots targeted by the query using a second search pipeline;

generate, with a ranker, a first ordering of the first plurality of screenshots;

generate, with the ranker, a second ordering of the second plurality of screenshots;

provide a response to the query comprising the first plurality of screenshots in the first ordering;

receive a rank of a user selected screenshot of the first plurality of screenshots in the first ordering;

modify the first search pipeline based in part on a determination that the user selected screenshot has a different rank in the second ordering; and

execute another query of the user history with the modified first search pipeline to generate a third plurality of screenshots.

16. The computer-readable storage medium of claim 15, wherein the second ordering of the second plurality of screenshots is generated with a second ranker.

17. The computer-readable storage medium of claim 15, wherein the first search pipeline identifies the first plurality of screenshots based on a comparison of a query embedding of the query to a screenshot region embedding of a region of a screenshot.

18. The computer-readable storage medium of claim 17, wherein the second search pipeline identifies the second plurality of screenshots based on a comparison of the query embedding of the query to a screenshot embedding of the screenshot.

19. The computer-readable storage medium of claim 15, wherein the first ordering and the second ordering are generated in parallel.

20. The computer-readable storage medium of claim 15, wherein a user knowledge store includes a first screenshot index and a second screenshot index, wherein the first search pipeline applies a first ranking weight to screenshots referenced by the first screenshot index and a second ranking weight to screenshots referenced by the second screenshot index when generating the first ordering of the first plurality of screenshots, and wherein the second search pipeline applies a third ranking weight to screenshots referenced by the first screenshot index and a fourth ranking weight to screenshots referenced by the second screenshot index when generating the second ordering of the second plurality of screenshots.

* * * * *